United States Patent [19]

Bilz

[11] Patent Number: 4,588,339

[45] Date of Patent: May 13, 1986

[54] TOOL HOLDER FOR A CUTTING MACHINE PROVIDED WITH NUMERICAL CONTROL

[75] Inventor: Reiner Bilz, Esslingen, Fed. Rep. of Germany

[73] Assignee: Otto Bilz, Werkzeugfabrik, Ostfildern, Fed. Rep. of Germany

[21] Appl. No.: 626,621

[22] Filed: Jul. 2, 1984

[30] Foreign Application Priority Data

Jul. 23, 1983 [DE] Fed. Rep. of Germany ....... 3326615

[51] Int. Cl.⁴ .................... B23C 5/16; B23Q 3/155; G09F 3/08
[52] U.S. Cl. .................................... 409/234; 29/568; 40/629; 40/630; 40/913; 279/1 TS; 408/16; 408/116; 409/80
[58] Field of Search ........................ 279/1 TS; 29/568; 33/181 R, 185 R; 40/628–630, 913; 408/3, 16, 116; 409/194, 79, 80, 234

[56] References Cited

U.S. PATENT DOCUMENTS

| | | | |
|---|---|---|---|
| 3,052,999 | 9/1962 | Sedgwick et al. | 279/1 TS |
| 3,128,645 | 4/1964 | Anthony | 279/1 TS |
| 3,173,204 | 3/1965 | Anthony | 279/1 TS |
| 3,858,892 | 1/1975 | Rutschke et al. | 279/1 TS X |

Primary Examiner—Gil Weidenfeld
Assistant Examiner—Steven C. Bishop
Attorney, Agent, or Firm—Michael J. Striker

[57] ABSTRACT

A tool of a metal-cutting machine provided with numerical control has an information data carrier for storing various data of tool characteristics such as the length, diameter, service life and other parameters of the tool. The data carrier is formed by an electrically erasable programmable read-only memory which has a large storage capacity. The memory is rigidly inserted in the tool or tool holder and is protected against damage and contamination. Inadvertent release and loss of the data carrier are avoided.

13 Claims, 7 Drawing Figures

TOOL HOLDER FOR A CUTTING MACHINE PROVIDED WITH NUMERICAL CONTROL

BACKGROUND OF THE INVENTION

The present invention relates to a tool or tool holder, particularly for use with a machining system provided with numerical control. More particularly, the invention relates to an information data carrier provided on a tool or a tool holder for carrying data of specific characteristics of the tool, such as its length, diameter, service life and other parameters.

Automatic machining systems with numerical control are normally provided with data carriers carrying data of specific characteristics of the tools and tool holders utilized in the system, which data carriers are in form of bar coding made on sticky labels which are glued to the tool holder. In order to transmit coded data to the control of the metal-cutting system this bar coding is usually scanned with an optical laser which feeds these data to the machine control. This type of the data carrier and data processing has however, some disadvantages. Optical lasers required in the above described data processing are susceptible not only to mechanical loads but also to contamination. Furthermore, there is always a danger with conventional devices that a label would be also either contaminated or lost, which often happens particularly because the machine is lubricated with oil. A further disadvantage of known data carriers is that in the case of wear-off the tool printed bars on the labels can not be seen and it would be unclear to an operator whether the tool is a newly adjusted and received from a test station or it has been used and removed from the spindle. It is known that after each operation process the tool should be removed from the spindle for reasons of safety, and under such conditions a label with printed bars thereon can be easily lost and a new label with actual data in form of bar coding should be glued to the tool. These manipulations, however are expensive. Furthermore, remaining glue layers contaminate the tool or tool holder.

SUMMARY OF THE INVENTION

It is an object of the present invent to provide an improved tool holder, in which the above disadvantages of conventional data carriers would be avoided.

This and other objects of the invention are attained by a tool holder or a tool provided with a data carrier for various characteristics of a tool, such as its length, diameter, service time or the like, and employed in conjunction with a machine tool provided with numerical control, wherein the data carrier includes an electrically erasable programmable readonly memory means fixedly inserted into the tool holder.

The tool holder or a tool may be formed with a pocket bore, said memory means being inserted in said pocket bore, said pocket bore extending through a diameter of the tool holder, or the tool, respectively.

The data carrier may further include a conductive carrier plate having a plurality of contacts, said contacts being electrically connected to said memory means, said contacts being electrically insulated from each other.

The pocket bore has a base; said carrier plate may have a side facing towards said base, said memory means being soldered to said side of the carrier plate, said carrier plate having a surface accessible from outside, said contacts being arranged on said accessible surface.

The contacts may be formed by individual contact points or by contact rings concentrically arranged relative to each other.

The memory means may be cast within said pocket bore and together with said carrier plate be secured against loss.

The memory means is held in said pocket bore in a predetermined reproducible and fixed-against-rotation position.

The memory means may be formed with at least one radially outwardly extended projection and said pocket bore is provided with at least one groove radially outwardly extended therefrom and receiving said projection in a form-locking manner to secure said memory means in said pocket bore against rotation.

Said projection may be made on said memory means by casting, said groove extending parallel to an axis of said pocket bore.

The tool holder or a tool, if the latter carries the data carrier according to the invention, may further comprise a contact plug including contact pins corresponding to and engageable with said contacts on said carrier plate, each of said contact pins being formed of two telescopically arranged portions displaceable relative to each other under spring action, one of said two portions of each contact pin being a front portion and provided at a front end with at least one tooth projected in the direction of elongation of the respective contact pin.

Said at least one tooth may be radially offset relative to an axis of the respective contact pin.

The contact plug may be formed with at least one internal passage for passing a cleaning pressure gas flow therethrough, said plug having a front side, said passage having an outlet opening at said front side.

The contact plug may include an insert insulated from said plug, said passage being formed in said insert; and wherein a pressure gas supply means is provided, connected to said passage.

It is advantageous that the data carrier of this invention, installed either on the tool holder or on the tool is applied directly at a measuring location on the control of the machining system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
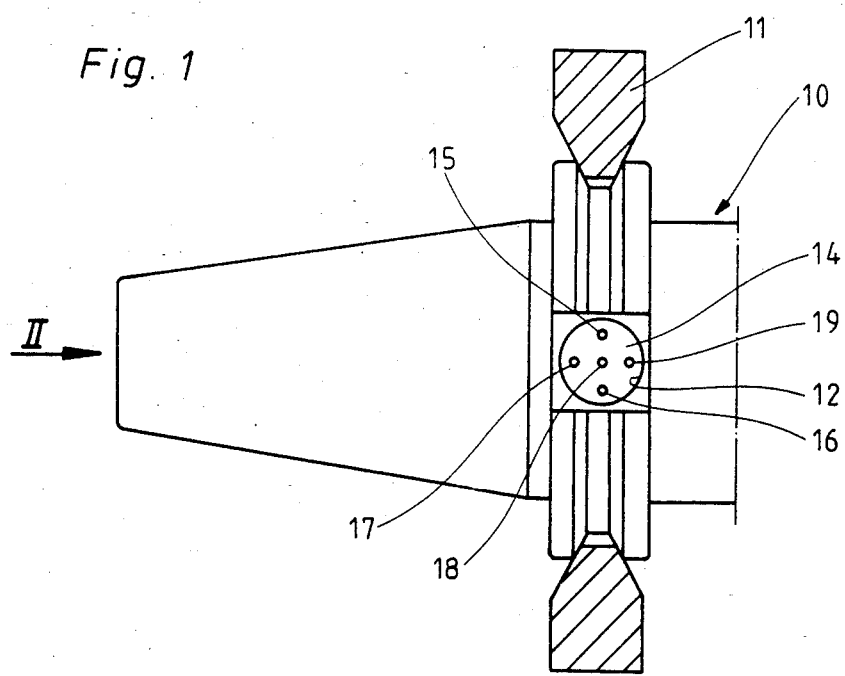
FIG. 1 is a schematic side view, partially in section, of a portion of the tool holder and the gripper engaged therewith.

Referring now to the drawings more specifically, reference numeral 10 designates a tool holder or a chuck for a tap drill or a drill and is particularly suitable for use in metal-removing machining carried out on numerically controlled automatic machining systems.

Tool holder 10 has in the region, in which standard surfaces for engaging with grippers 11 for an automatic tool exchange in a spindle, are provided, a central pocket bore 12.

Figure 2:
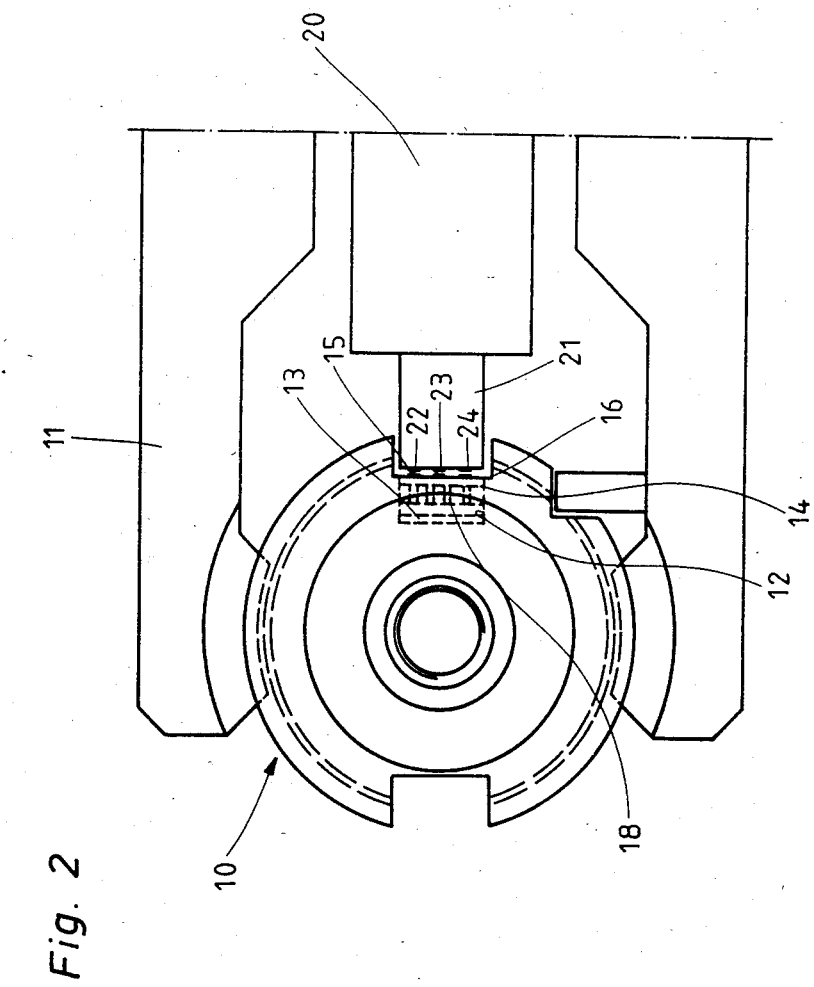
FIG. 2 is a front view of the tool holder seen from arrow II of FIG. 1.

As most clearly shown in FIGS. 1 and 2, the tool holder 10 is provided with an information data carrier for various characteristic data of the unit comprised of the tool holder and the tool inserted into the holder. These characteristic data normally include the length, the diameter of the tool in the cutting area and other specific parameters. This data carrier is a memory element or accumulator 13, which is electrically erasable programmable read-only memory or so-called EE-PROM, which is rigidly inserted into the tool holder. Accumulator 13 is soldered at its one side to a conductive plate 14, and at its other side it extends along the base of the pocket bore 12. Conductive plate 14 has at its outer accessible side a number of contacts 15-19 which here are formed as contact surfaces. Contacts 15-19 are insulated from each other and are electrically connected to the accumulator 13. Five contacts 15-19 are provided in the exemplified embodiment discussed herein.

Each individual contact may be alternatively formed by a contact ring, and the individual contact rings may be concentrically arranged relative to each other.

Accumulator 13 is positioned within the pocket bore 12, in which it can be also cast, for example by means of plastics. Contacts 15 and 16 serve for example to connect the memory element to a voltage supply while remaining contacts 17 through 19 are provided for interrogation and unloading or charging of the memory 13.

Memory 13 has no special current supply which is not necessary. The memory element is designed so that it supports itself without the requirement of a current supply.

Figure 3:
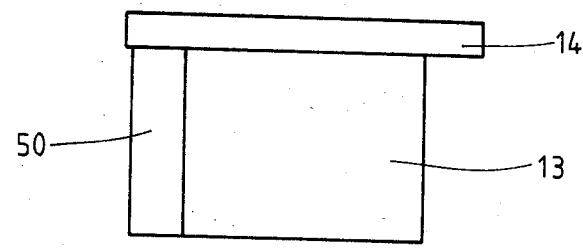
FIG. 3 is a schematic side view of the carrier plate with a memory thereon on an enlarged scale.
Figure 4:
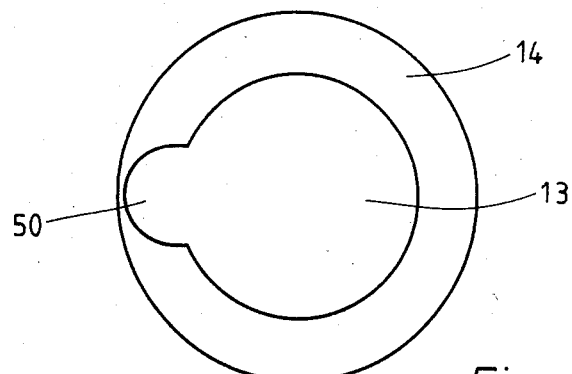
FIG. 4 is a plan view of the memory and the carrier plate seen from below.
Figure 5:
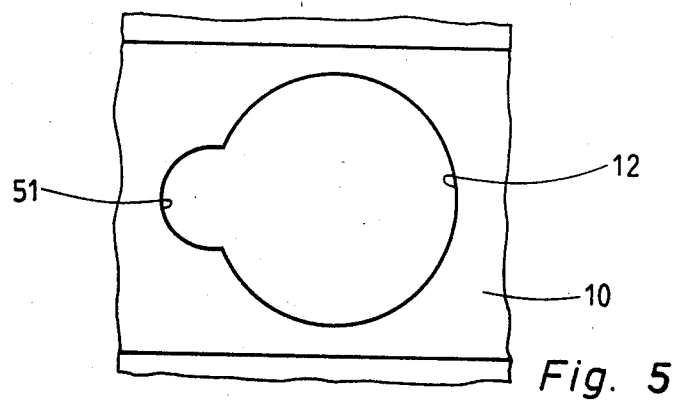
FIG. 5 is a top plan view of the portion of the tool holder provided with a pocket bore.

Reference is now made to FIGS. 3-5. As seen from these figures memory element is provided with means which ensures that memory element 13 is rigidly held in pocket bore 12 in a predetermined reproducible, relative rotational position. This means includes at least one radial projection 50 formed on the memory 13 and at least one groove 51 formed in pocket bore 12 and receiving radial projection 50 in a form-locking fashion in a one predetermined position which secures memory 13 against rotation in pocket bore 12. Projection 50 is rigidly connected to the body of the memory element and is made by casting. This projection extends radially outwardly from memory element 13 somewhat as a nose and axially it extends, for example over the entire length of memory 13. Groove 5 extends parallel to the axis of bore 12 within the wall of the pocket bore 12. Thereby it is ensured that upon the insertion of memory 13 with the conductive plate 14 into pocket bore 12 a rigid predetermined insertion position is reproducibly warranted.

Thus, the handling of the structural unit comprised of the tool holder 10 and a tool inserted therein is facilitated when this unit is applied to an automatic machining system with numerical control.

Before this unit is installed in the tool magazine of the machining system a predetermined space should be provided there and the unit would be first adjusted to a measuring space. This space is defined by a plunger 20 clearly shown in FIG. 2. Plunger 20 is coaxially displaceable towards the pocket bore 12 and memory 13, for example, by means of lifting magnets commonly known for this purpose and not shown herein. Plunger 20 has, at the front end thereof facing towards memory 13, a contact plug 21 which carries individual thin contact pins 22 to 26, of which only the ends of three pins 22, 23 and 24 corresponding to contacts 15, 18 and 16, respectively, are seen in FIG. 2.

Figure 6:
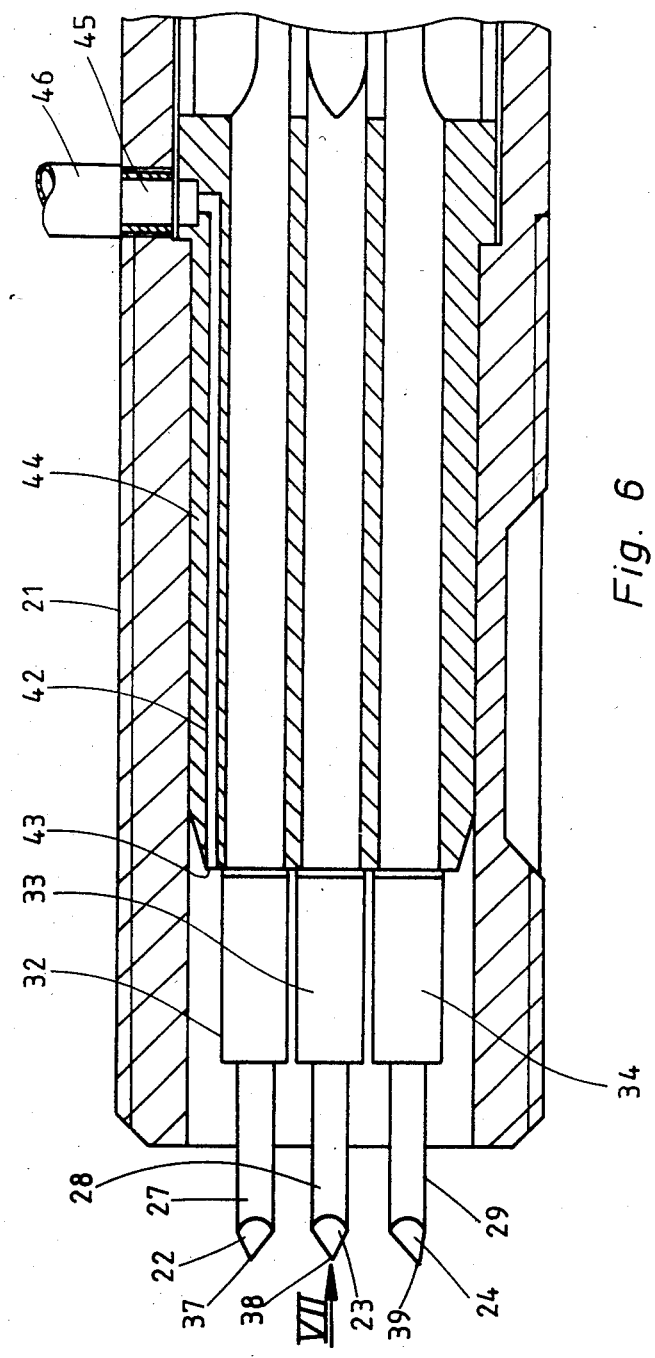
FIG. 6 is a schematic axial section through a portion of the contact plug.
Figure 7:
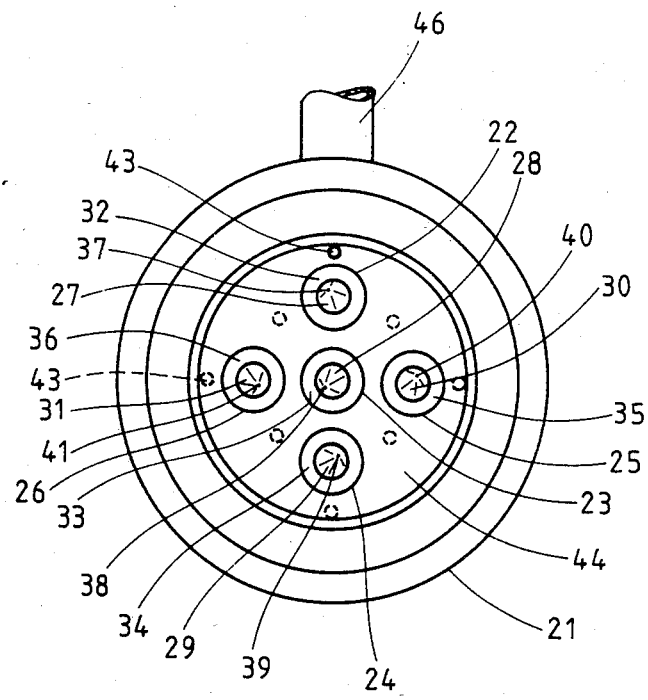
FIG. 7 is a front view seen from arrow VII of FIG. 6.

As can be seen from FIGS. 6 and 7, which illustrate contact plug 21 in greater detail, the diameters of contact pins 22-26 are advantageously very small. These contact pins are each formed of two telescopically displaceable portions 27-36. The telescopical displacement of each two portions of each contact pin takes place in a conventional fashion under the action of a spring not shown herein. Thinner projecting portions 27-31 are each provided at the front end thereof with at least one tooth having, preferably, an eccentric or central tip 37-41, which permit the avoidance of contamination of the contacts and provide for a satisfactory electrical contact.

Front portions 27-31 of the contact pins can be formed with a plurality of axially extended teeth which would form a crown.

Each front portion 27-31 of each contact pin 22-26 is drivingly coupled with the corresponding rear portion 32-36 so that simultaneously with the telescopic displacement of front portions 27-31 relative to the rear portions 32-36 each front portion is actuated in the direction of rotation about the axis of the respective contact pin. This superposed rotation takes place during the displacement of each front portion into the respective rear portion of each contact pin so that tips 37-41 perform a corresponding movement on the outer surfaces of contacts 15-19. Thereby eventual contamination or corrosion layers on the outer surfaces of contacts 15-19 can be broken and scratched off. Therefore endurance of good electrical contact during the insertion of the contact pins into the respective contact surfaces is ensured. Inasmuch as tips 37-41 are positioned outside the respective axes of the contact pins the rotation of front portions 27-31 acts such that tips 37-41 move in the peripheral direction.

As can be further seen from FIGS. 6 and 7 the contact plug 21 has at least one inner passage 42 provided with a frontside outlet or exhaust opening 43 through which a stream of cleaning gas, particularly pressure air, is fed in the forward direction. Passage 42 extends within an insulating insert 44 mounted in, the contact plug 21. Passage 42 is in communication with a radial bush 45 which serves as a pressure gas supply. Tube or hose 46 is connectable to radial bush 45. A control valve for controlling a pressure gas flow can be provided which, for example would be controlled simultaneously with the displacement of front portions 27-31 within rear portions 32-36 of contact pins 22-26 in the direction of release of the gas stream. Such a control may be also carried out by hand and independently from the displacement of the front thinner portions 27–31 of the contact pins. If the flow of pressure gas, for example pressure air, is conducted through passage 42 this flow is discharged via outlet opening 43 and flows in the direction towards contacts 15–19 to clean the outer surfaces of these contacts so as to remove therefrom dust or similar deposits.

A plurality of similar or identical pressure gas passages 42 with outlet openings 43 may be provided in insulating insert 44 of the contact plug, as shown in FIG. 7 by dotted lines.

If plunger 20 with contact plug 21 and its contact pins 22–26 is moved in the leftward direction to the side of conductive plate 14 accessible from outside, individual contact pins 22–26 will press against the respective contacts 15–19 to provide a contact. Voltage is applied to memory 13 through contacts 15 and 16. By measuring of the perimeters of the unit, comprised of the tool holder and the tool inserted in the holder, by setting the memory 13 in that insert, not only characteristic data of the tool can be determined but also correcting data necessary in the case of wear of the tool.

The tool unit provided with memory 13, which is an integral component part of this unit, is applied to a tool magazine of a machining system with numerical control. Upon insertion of this unit at a corresponding location in the tool magazine, individual data stored in the memory 13 are transmitted and directed via the plunger 20 with contact plug 21 and contact pins 22–26 to a control system of the machine. The insertion of the tool unit in the tool magazine can be carried out by hand or, for example by means of an automatic tool-exchange device of the machine, which has a gripper positioned in the region of the vertical carriage; one end of the gripper engages with the spindle of the machine while another end of the gripper engages with a new tool positioned in the tool magazine in a tool-exchange position. In order to place the tool unit into the tool magazine this unit is plugged in the operating spindle and then a tool exchange is executed by the gripper. In this process specific tool characteristic data stored in memory 13 can be sensed via plunger 20 and contact plug 21, immediately positioned on the gripper 11 and transmitted to and stored in the control of the numerically controlled machining system.

The advantages of the present invention are as follows:

The sensed data of common or specific parameters of the tool are stored on the integrated circuit IC of the memory 13. Memory 13 has a large capacity, for example 32×32 bits which is a multiplex storage capacity, for example of sticky labels, which are provided with a bar coding, as known in the field of foodstuffs or similar products. Memory 13 ensures storage of the data for at least 10 years and enables a data change in the order of at least 10,000 storage-erasing cycles; the memory 13 is non-susceptible to the influence of magnet field and is resistant to temperature fluctuations up to 120° C. Since memory 13 is an integral non-releasable component part of the tool holder 10 there is no danger that the data carrier would be inadvertently lost and it would be impossible to collect the tool characteristic data, or incorrect data would be passed to the control of the machining system.

A further advantage of the present invention is that memory 13 is protected against damage and contamination. Due to the provision of the electrically erasable programmable only-read memory this memory can be every time carried over, without additional handling and dismantling of the tool holder; in other words memory data can be first erased and the memory can be supplied again with new data.

Still another advantage of the proposed device resides in that it offers a possibility of erasing partially or completely the data stored in memory 13 (independent erasing) when the tool unit is inserted into the spindle and is set into operation and after the tool exchange has been completed. Then if the tool unit is inserted into the tool magazine there will be no danger that this insertion would prevent measurings and readjustings on the machine during a further running of the machine and that the tool unit during the interrogation of memory 13 would not be received by the tool exchanger provided on the tool magazine.

The tool unit is selected so as to correspond to a measuring place, at which the memory, supplied with new data, particularly correcting data, is to be set. Since memory 13 has no individual voltage supply there is no danger that stored tool-characteristic data would be sorted out from the tool holder 10 with inserted tool and become lost.

It will be understood that each of the elements described above, or two or more together, may also find a useful application in other types of tool holders for metal-cutting machines provided with numerical control differing from the types described above.

While the invention has been illustrated and described as embodied in a tool holder for an automatic machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a tool holder provided with a data carrier for various characteristics of a tool, such as its length, diameter, service time, or the like, and employed in conjunction with a machine tool provided with numerical control, the improvement comprising the data carrier including a memory means carrying an electrically erasable programmable read-only memory and being fixedly inserted into the tool holder, said holder being formed with a pocket bore, said memory means being cast within said pocket bore and being secured against loss, said memory means being held in said pocket bore in a predetermined reproducible and fixed-against-rotation position.

2. The tool holder as defined in claim 1, said pocket bore extending through a diameter of the tool holder.

3. The tool holder as defined in claim 2, wherein said data carrier further includes a conductive carrier plate having a plurality of contacts, said contacts being electrically connected to said memory means, said contacts being electrically insulated from each other.

4. The tool holder as defined in claim 3, wherein said pocket bore has a base, said carrier plate having a side facing towards said base, said memory means being soldered to said side of the carrier plate, said carrier plate having a surface accessible from outside, said contacts being arranged on said accessible surface.

5. The tool holder as defined in claim 4, wherein said contacts are formed by individual contact points.

6. The tool holder as defined in claim 4, wherein said contacts are formed by contact rings concentrically arranged relative to each other.

7. The tool holder as defined in claim 1, wherein said memory means is formed with at least one radially outwardly extended projection and said pocket bore is provided with at least one groove radially outwardly extended therefrom and receiving said projection in a form-locking manner to secure said memory means in said pocket bore against rotation.

8. The tool holder as defined in claim 7, wherein said projection is made on said memory means by casting, said groove extending parallel to an axis of said pocket bore.

9. The tool holder as defined in claim 3; further comprising a contact plug including contact pins corresponding to and engageable with said contacts on said carrier plate, each of said contact pins being formed of two telescopically arranged portions displaceable relative to each other under springy action, one of said two portions of each contact pin being a front portion and provided at a front end with at least one tooth projected in the direction of elongation of the respective contact pin.

10. The tool holder as defined in claim 9, wherein another of said two portions of each contact pin is a rear portion, the front portions of said contact pins being displaceable to and engageable with said respective contacts and being simultaneously with and independently from said displacing rotatable about respective axes of said contact pins.

11. The tool holder as defined in claim 9, wherein said at least one tooth is radially offset relative to an axis of the respective contact pin.

12. The tool holder as defined in claim 1, wherein said contact plug is formed with at least one internal passage for passing a cleaning pressure gas flow therethrough, said plug having a front side, said passage having an outlet opening at said front side.

13. The tool holder as defined in claim 12, wherein said plug includes an insert insulated from said plug, said passage being formed in said insert; and wherein a pressure gas supply means is provided, connected to said passage.

* * * * *